Figure 1:
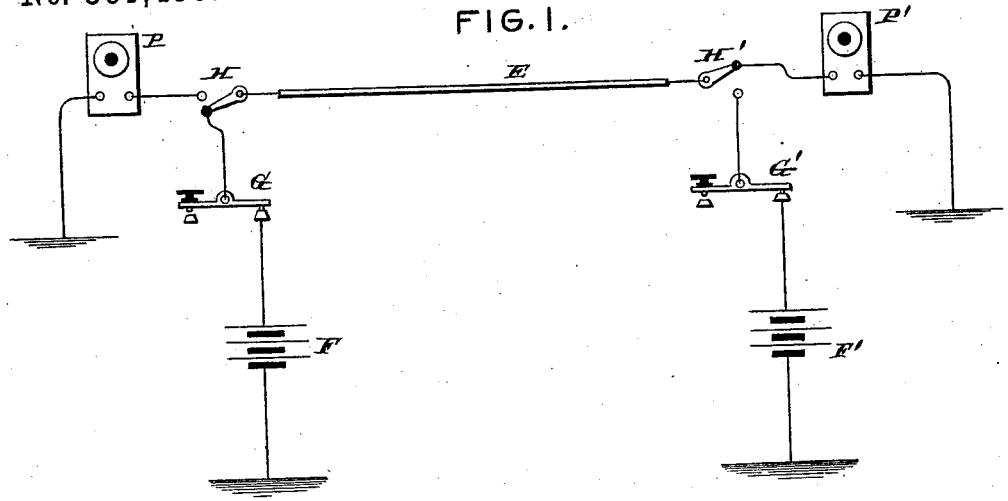

(No Model.)  2 Sheets—Sheet 1.

M. G. FARMER.
METHOD OF AND APPARATUS FOR SIGNALING THROUGH SUBMARINE CABLES.

No. 361,498. Patented Apr. 19, 1887.

ATTEST-
J. Henry Kaiser
Ann J. Scott

INVENTOR-
Moses G. Farmer
By Duncan, Curtis & Page
Attys.

(No Model.) 2 Sheets—Sheet 2.

M. G. FARMER.
METHOD OF AND APPARATUS FOR SIGNALING THROUGH SUBMARINE CABLES.

No. 361,498. Patented Apr. 19, 1887.

ATTEST. INVENTOR.
J. Henry Kaiser Moses G. Farmer
Wm. H. Scott By Duncan, Curtis & Page
 attys.

United States Patent Office.

MOSES G. FARMER, OF ELIOT, MAINE.

METHOD OF AND APPARATUS FOR SIGNALING THROUGH SUBMARINE CABLES.

SPECIFICATION forming part of Letters Patent No. 361,498, dated April 19, 1887.

Application filed December 13, 1886. Serial No. 221,408. (No model.)

*To all whom it may concern:*

Be it known that I, MOSES G. FARMER, a citizen of the United States, residing at Eliot, in the county of York and State of Maine, have discovered a certain new and useful Method of and Apparatus for Signaling Through Insulated Submarine Cables, of which the following is a specification, reference being had to the drawings accompanying and forming a part of the same.

When a battery is placed in connection with the home end of a long submarine cable, a sensible time elapses before the effects of the current become evident at the distant or receiving end upon any of the instruments heretofore employed in signaling. The electric current, instead of manifesting itself with its full force or effect simultaneously with or immediately after the closing of the circuit, gradually rises in strength or increases from a minimum to a maximum, although during the entire interval in which this effect is taking place the full current may be flowing into the cable at the sending end. A similar but opposite phenomenon is observed when the sending end of the cable is transferred from the battery to the ground, as is done in discharging the cable. In this case there is at first a somewhat sudden fall in the current, which becomes more and more gradual, so that a rapid succession of alternate contacts with the battery and with the earth at the sending end produces at the receiving end an undulating or alternately rising and falling although unbroken current. If, in order to produce each signal, it were necessary for the current to rise from a minimum to its maximum and then fall back to its minimum, the speed of signaling on long cables would be extremely slow; but instruments have been constructed which are capable of following and indicating or recording gradual changes in the electrical condition of the cable, and when these are used it is only necessary that the current should vary to the extent of a fraction of its maximum, by which means a much greater number of impulses may be transmitted or electrical changes produced and utilized for signaling in a given time. The speed of signaling through any given cable, therefore, depends on the one hand upon the sensitiveness of the signaling-instrument to respond to small variations of current, and consequently upon the time that must elapse between the closing of the circuit at the sending end and the response of the instrument at the receiving end, and, on the other hand, upon its capability of recovering from such action or operation, and thus upon the time that must elapse between the grounding of the cable and the restoration of the instrument to a condition in which it is capable of a new movement or operation. The highest practicable speed of signaling that has heretofore been attained on a long cable—such as one of those spanning the Atlantic Ocean—is about fifteen to seventeen words in a minute. It has been demonstrated, however, that at the instant of closing the circuit on a long cable an extremely feeble current appears at the remote end; but heretofore no means have been known of utilizing this initial and almost infinitesimal current for any useful or practical purpose whatever.

I have discovered a means of producing intelligible signals by means of this hitherto unavailable current, or, in other words, of producing at the receiving end of a cable signals apparently and practically synchronous with the action or operation of a transmitting key or like device at the sending end, which makes, breaks, or otherwise abruptly disturbs the electrical condition of the cable. The radical improvement and great advantages of a system capable of effecting this are made manifest by the consideration that in all systems of working long submarine cables heretofore known the speed of signaling has been limited by the sensitiveness of the receiving-instruments, or, in other words, to the rate at which such instruments are capable of responding to current changes, while by my invention, in which the receiving-instrument responds seemingly instantly to the closing or the opening of the circuit, or to any change in the polarity of the current, the speed of signaling is limited only by the ability of the receiving-operator, reading by sound, to interpret and record the messages sent.

The system may be practically carried out in several (though equivalent) ways. For example, I provide an earth-connection or ground at each of the opposite ends of a continuous cable. I use a galvanic battery and an ordinary Morse key connected directly in the line at the sending end for producing the necessary current effects or changes in the electrical condition of the cable, while at the receiving end I employ a receiving-instrument possessing certain essential characteristics, which will be more fully hereinafter set forth.

One form of this instrument which I have found to fulfill satisfactorily the required conditions consists of a polarized or permanently magnetized core, around which is a coil of insulated wire, together with a plate supported in close proximity to the end of the core. This plate is either of thin sheet-iron or of some other material, to which an iron armature is attached. The coil is included directly in the cable circuit, and every movement of the key at the sending end, that either connects a battery with or disconnects it from the circuit through the cable, causes the said plate to emit a distinctly audible sound. Using such a receiver in the manner of an ordinary Morse sounder, preferably in connection with devices for concentrating the sound and conveying it to the ear, messages may be received by it in the same manner as is now done by the relays and sounders of land lines.

This instrument differs from those heretofore used for receiving cable messages in that a signal—in this case an audible sound—is manifested upon the first disturbance of the molecular equilibrium of the instrument consequent upon the beginning of the flow of the current through the coil, although no other or further sound is apparent thereafter from the subsequent molecular changes while the current is increasing gradually to its maximum strength; but another distinctive sound is emitted at the very instant when the molecular condition of the instrument, due to any given rise in the current, begins to be disturbed by the falling off of the current, due to the withdrawal of the battery or the transfer of the sending end of the cable to earth, or both, although no further audible sound is produced by the molecular changes which take place while the current falls from that point to zero; and so, also, any change in the polarity of the current would cause the instrument to emit a sound, although no sound would be produced by gradual changes of current-strength immediately following such reversals of polarity. As opposed to this principle of operation, all previous instruments have been brought into action, not by the first impulse of the nascent or the cadent current, but only after their continued subjection to the influence of a growing or declining current, this being due to the circumstance that the indications produced by such instruments have been dependent upon an actual movement of some of their parts in space, which could only be attained when succeeding increments of current had produced a sufficiently-powerful electro-magnetic effect to overcome the inertia of the moving parts of the instruments.

Both the construction of the receiver and the general arrangement of the circuit may be very much modified without departure from the principle or law of operation upon which this discovery is based.

Without attempting to set forth in detail any of the numerous equivalents for the particular form of receiver above described, I may state that any instrumentality or combination of parts that forms an electrical signaling apparatus capable of emitting one distinctly-audible sound in response to an abrupt or sudden, as distinguished from a gradual or continuing, change in the electrical condition of the circuit with which it is connected or used is an equivalent of the form of receiver which I have selected in illustration of the principle, and this without regard to the absolute potential of charge so long as the polarity of the circuit remains unchanged, and also without regard to the extent of such abrupt change.

Instead of sending a battery-current directly into the cable, an induction-coil at the sending end may be interposed in the cable circuit and induced impulses of current developed therein; or an induction-coil may be used at each end of the line, that at the sending end having its secondary in the line, and that at the distant end having its primary in the line and its secondary forming a local circuit containing the receiver. Moreover, condensers may be introduced into the line at either or both ends, as for the purpose of cutting off earth-currents, without departing from the spirit of the invention.

Having thus set forth the general character of the discovery, I shall now describe the same more in detail by reference to the accompanying drawings.

Figure 5:
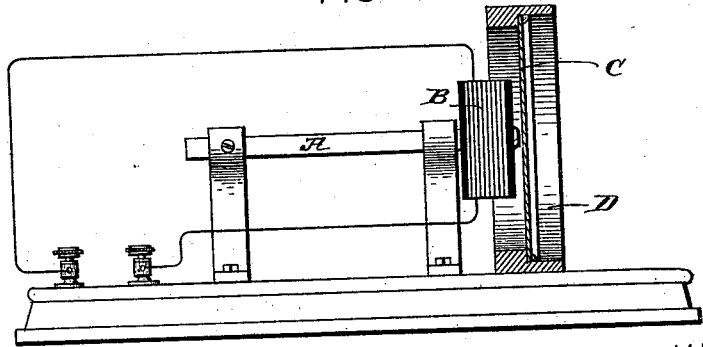

Figures 1, 2, 3, and 4 are diagrams of different forms or modifications of the system. Fig. 5 is a part sectional view of the receiving-instrument.

The transmitting-instruments are not shown in detail, as any ordinary form of Morse key or other circuit-controlling device may be used for this purpose.

Referring to Fig. 5, A is a magnetized steel core mounted or supported in any convenient manner, preferably with the capability of longitudinal adjustment. Surrounding the core is a coil, B, of insulated wire, preferably near one end or pole, and in face of such pole, and in very close proximity thereto, is a plate or disk, C, of magnetic material, which is supported by a frame, D, or by any other convenient means.

The specific construction of this instrument may be greatly varied. I have used cores of various lengths and diameters and coils varying very widely in resistance. I have also used plates of many shapes and sizes and of different material. For example, I have used a mica disk with a small button of iron attached to its center, and all of these various devices give in different degrees the same result. As a specific example, with an artificial line of about four thousand eight hundred ohms resistance and eight hundred microfarads capacity I have secured the best results by using a steel core of about five inches in length and three-eighths of an inch in diameter, the pole or end near the plate being somewhat reduced in size—say about one-fourth of an inch across. The coil surrounding the core was of comparatively fine wire and of about four ohms resistance, and the plate or disk of thin sheet-iron two to two and a half inches in diameter. From this and many other experiments I have demonstrated, first, that preferably the end of the core or magnet should be quite small—that is to say, of not greater diameter than one-half inch, and preferably much smaller—amounting to what may be considered a blunt point; and, second, that the resistance of the coil surrounding the magnet must be very low as compared with the line—that is to say, of not more than a few ohms resistance. I have, however, obtained good results with coils whose resistance was as high as seventy ohms, and even higher.

Figs. 1, 2, 3, and 4 illustrate the general manner in which this system is carried out. In these figures, P and P' represent the receiving-instruments at opposite ends of the cable E. At each end of the cable is also a galvanic battery, F F', of about the same capacity as those now used in signaling. One pole of the battery is grounded and the other adapted to be connected to line by an ordinary make-and-break key, G G'.

Figure 2:
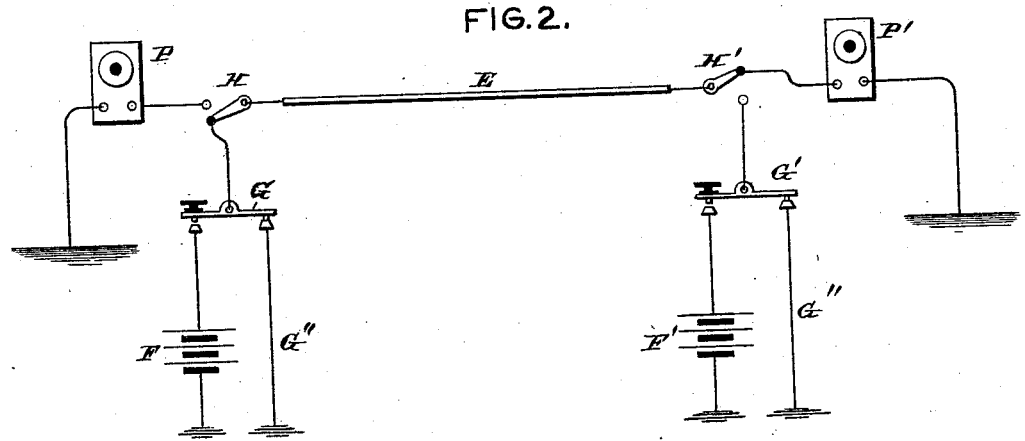
Figure 3:
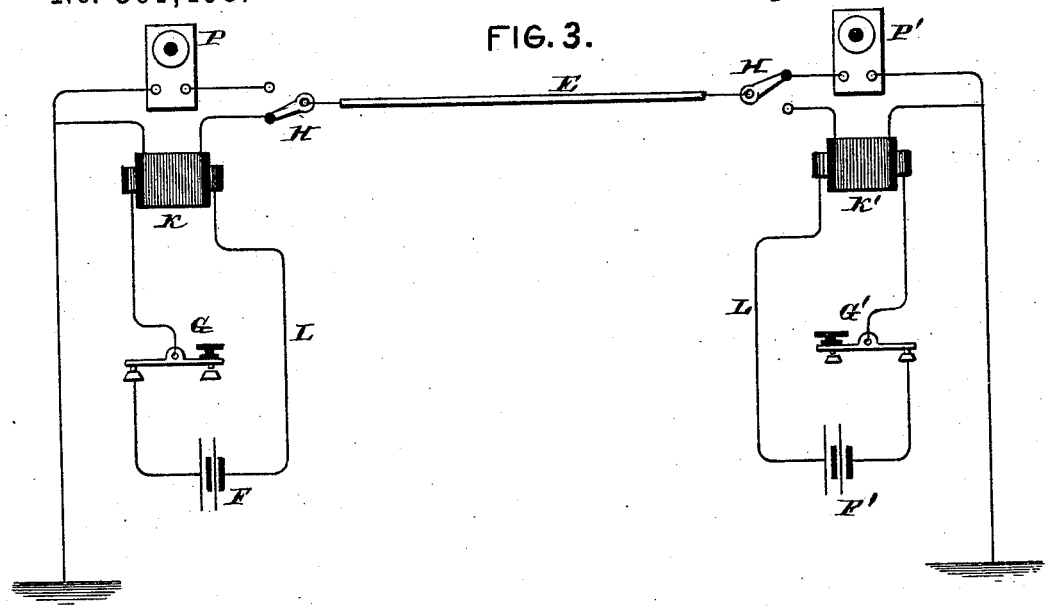
Figure 4:
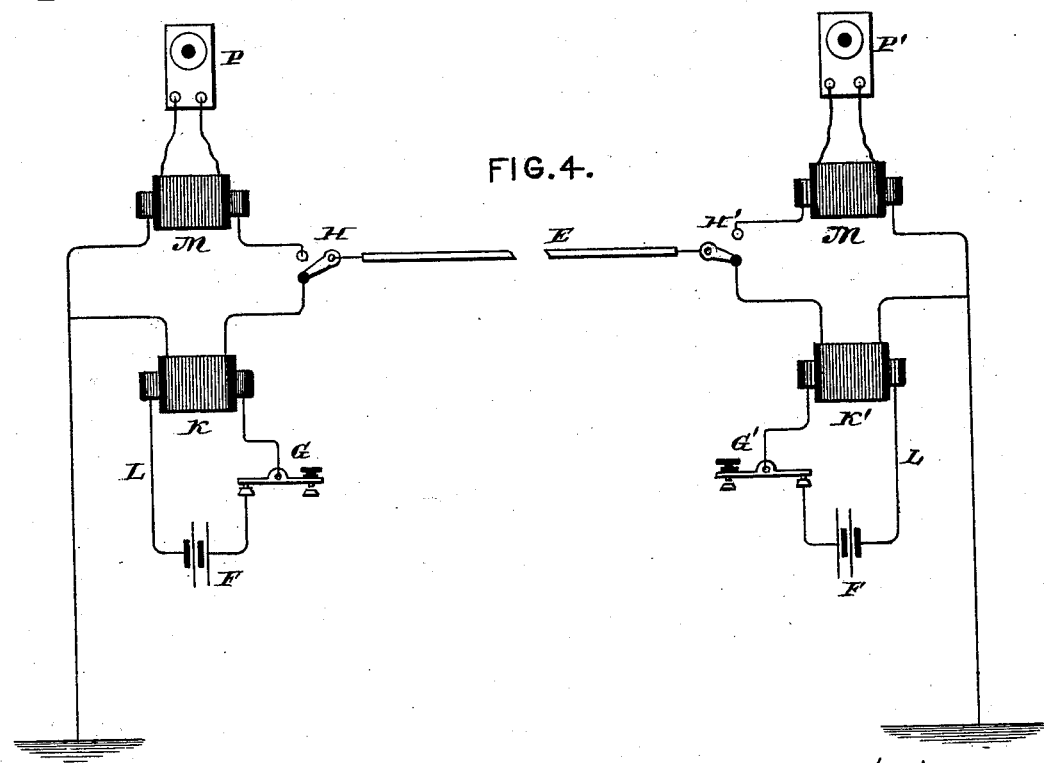

Switches H H', Fig. 1, are provided at the terminals for grounding the cable through the receiver or connecting it with the key. Any other ordinary disposition of these parts is of course possible. In the present case one operator works the key G to produce Morse or other signals in the receiver P', from which the receiving-operator reads the message. In Fig. 2 the same devices are shown, but in this case the upward or back movement of the transmitting-key disconnects the sending end of the cable from the battery and connects it to ground through wire G''. This particular form of key or transmitter I especially prefer for long cables, as it enables the cable to discharge at both ends after each signal. In Fig. 3 induction-coils K K' are used. The batteries in this case are in local circuits L, in which are the keys G G' and the primaries of the induction-coil. The secondaries of these coils are grounded at one end, and switches H H' connect the cable either with the other ends of the secondaries or with the receivers, as is clearly shown. In Fig. 4 another modification is shown. The arrangement is similar to that shown in Fig. 3, except that the receiving-instrument, in lieu of being connected directly to the line, is in the secondary circuit of an induction-coil, M, whose primary is in the line. There is thus a double conversion of current. The interruption of the local circuit at the sending end induces an impulse in the secondary of the induction-coil connected with it, and this impulse in the cable induces a second impulse, which produces the sound in the receiver. The results obtained by the use of the induction-coils thus arranged appear to be fully equal to or even better than those obtained when one or no coil is employed.

As I have stated above, the sounds produced by the receiver on a long cable are due to abrupt or sudden changes in the electrical condition of the line and not to the gradual rise or fall of the current; hence, for each stroke or up-and-down movement of a make-and-break key or of a three-point key at the transmitting end, whether it be made slowly or rapidly, two distinct sounds are emitted, one when the battery is applied, another when it is detached; so, also, when an induction-coil is used, a sound accompanies the making of the primary circuit and another the breaking. One of these sounds will always be found slightly more distinct or louder than the other, so that the conditions should always be such that the louder sound precedes the other—as, for example, when an induction-coil is used, a break-and-make or back contact-key should be placed in the normally-closed local circuit of the primary. This is shown in Fig. 3. The direct reading of Morse signals, technically termed "dots" and "dashes," is thus made practicable.

What I claim is—

1. The method of signaling through circuits of high electrostatic capacity, such as submarine cables, which consists in abruptly changing the electrical condition of the cable circuit and utilizing the initial effect immediately attendant upon such changes to produce at the opposite or receiving end of the cable sounds or audible signals, as set forth.

2. The method of receiving telegraphic signals through circuits of high electrostatic capacity, such as submarine cables, which consists in utilizing the initial effects of current changes in the circuit to produce sounds or audible signals, as herein described.

3. The combination, with a circuit of high electrostatic capacity, such as an insulated submarine cable, of a source of electricity, a transmitter consisting of a key or circuit-controller, and a receiving-instrument, substantially as described, capable of audibly responding to abrupt or sudden, as distinguished from gradual, changes in the electrical condition of the circuit, as herein set forth.

4. The combination, with a circuit of high electrostatic capacity, such as an insulated submarine cable, of a source of electricity, a transmitter consisting of a key or circuit-controller, and a receiver consisting of a polarized or permanently-magnetized core having a pointed end or pole, as set forth, surrounded by an insulated coil connected, directly or indirectly, with the cable circuit, and a plate of magnetic metal in proximity to the pointed end of the core, as herein set forth.

5. The combination, with a circuit of high electrostatic capacity, such as an insulated submarine cable, of a battery or other source of electricity, a transmitter consisting of a key or circuit-controller, and a receiver consisting of a polarized or permanently-magnetized core having a pointed end or pole, as set forth, surrounded by an insulated coil of low resistance connected with the cable circuit, and a magnetic plate in proximity to the pointed end of the core, as herein described.

6. The combination, with a circuit of high electrostatic capacity, such as an insulated submarine cable, having an earth-connection at each end, of a battery or current-generator included in the circuit formed by said cable, a transmitter for making and breaking the continuity of the cable circuit or producing therein equivalent current-impulses, and a receiver consisting of a permanent magnet surrounded by a coil of low resistance and a thin sheet-iron or equivalent plate in proximity to the pole of said magnet, as herein set forth.

7. The combination, with a circuit of high electrostatic capacity, such as an insulated submarine cable, of a battery, a key or circuit-controller, one or more induction coils included in the cable circuit for converting or reproducing the changes in the battery-current, and a receiver, substantially as described, capable of audibly responding to abrupt or sudden, as distinguished from gradual, changes in the electrical condition of the circuit, as herein set forth.

8. The combination, with an insulated submarine cable, of a source of electricity, a key capable of two positions, one of which places the sending end of the cable in connection with the said source of electricity, while the other places the same in direct communication with the earth, and a receiver included in or receiving electrical impulses from the remote end of the cable circuit and constructed in the manner herein described, whereby it is capable of audibly responding to abrupt or sudden, as distinguished from gradual, changes in the electrical condition of the circuit, as herein set forth.

Signed this 6th day of December, 1886.

MOSES G. FARMER.

Witnesses:
M. F. KEEFE,
TIMO. DAME.